(12) United States Patent
Fujimura (10) Patent No.: US 9,491,395 B2
(45) Date of Patent: Nov. 8, 2016

(54) TUNING CIRCUIT AND RECEIVER (71) Applicant: Funai Electric Co., Ltd., Osaka (JP)

(72) Inventor: Kenji Fujimura, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 14/754,703

(22) Filed: Jun. 30, 2015

(65) Prior Publication Data

US 2016/0006972 A1    Jan. 7, 2016

(30) Foreign Application Priority Data

Jul. 1, 2014   (JP) .................................. 2014-136239

(51) Int. Cl.
*H04B 1/18*   (2006.01)
*H04N 5/50*   (2006.01)
*H04B 1/10*   (2006.01)
*H04B 1/16*   (2006.01)
*H04B 1/28*   (2006.01)
*H04N 5/445*  (2011.01)
*H04N 21/426* (2011.01)
*H04N 21/438* (2011.01)

(52) U.S. Cl.
CPC .............. *H04N 5/50* (2013.01); *H04B 1/1027* (2013.01); *H04B 1/1638* (2013.01); *H04B 1/28* (2013.01); *H04N 5/44513* (2013.01); *H04N 21/42607* (2013.01); *H04B 2001/1072* (2013.01); *H04N 21/4383* (2013.01)

(58) Field of Classification Search
CPC ... H04B 1/16; H04B 2001/1072; H04N 5/50
USPC .......... 455/73, 77, 87, 120, 125, 178.1, 306, 455/307, 130, 150.1
See application file for complete search history.

(56) References Cited

U.S. PATENT DOCUMENTS 5,097,221 A    3/1992  Miller
6,965,656 B2 * 11/2005 Koizumi ............. H04L 27/3809
                                                    375/345

(Continued)

FOREIGN PATENT DOCUMENTS

JP    2009-016912 A    1/2009
JP    2009-058485 A    3/2009

OTHER PUBLICATIONS

The extended European search report dated Nov. 30, 2015.

*Primary Examiner* — Tuan Pham
(74) *Attorney, Agent, or Firm* — Yokoi & Co., U.S.A.; Toshiyuki Yokoi (57) ABSTRACT

The present invention discloses a tuning circuit that includes a first band-pass filter that passes a first predetermined frequency band corresponding to the selected channel in the broadcast signal, a mixing circuit that generates a mixed signal by mixing a signal having a predetermined frequency band corresponding to the selected channel with the broadcast signal passed through the first band-pass filter, and a second band-pass filter that passes a second predetermined frequency band in the mixed signal. At least one of a first frequency of the first band-pass filter and a second frequency of the second band-pass filter of the selected channel is changed. The present invention provides a receiver that can improve a quality of the output signal. By using the tuning circuit for a receiver, a quality of the output signal can be improved.

14 Claims, 10 Drawing Sheets

(56) References Cited

U.S. PATENT DOCUMENTS 7,369,827 B1 * 5/2008 Koch ................ H04N 7/17309
                                                                         348/E7.07

2005/0113143 A1 * 5/2005 Oiwa ................ H04B 7/082
                                                                         455/562.1

* cited by examiner

| channel | first frequency pass band | second frequency pass band |
|---|---|---|
| 1 | 450 | 455 |
| 2 | 460 | 465 |
| 3 | . | . |
| 5 | . | . |
| 7 | . | . |
| 10 | . | . |
| 20 | 520 | 525 |

TUNING CIRCUIT AND RECEIVER

CROSS-REFERENCES TO RELATED APPLICATIONS

This patent specification is based on Japanese patent application No. 2014-136239 filed on Jul. 1, 2014 in the Japan Patent Office, the entire contents of which are incorporated by reference herein.

BACKGROUND OF THE INVENTION

1. Field of the Invention

The present invention relates to a tuning circuit that extracts a signal corresponding to a predetermined channel form a television radio wave.

2. Description of the Related Art

A tuning circuit is used for extracting a band part corresponding to the selected channel from the television radio wave received by an antenna. The tuning circuit can extract a broadcast program by passing only a part synchronizing with the band of the selected channel.

In Patent documents 1 and 2, the tuning circuit using a superheterodyne method is disclosed as the tuning circuit. The tuning circuit using the superheterodyne method extracts a desired output signal by mixing the television radio wave with a local signal corresponding to the selected channel.

In the Patent documents, filters are provided before and after a mixing circuit and pass bands of the filters are fixed. Therefore, an input signal input from the antenna passes through the filter and then is mixed with the local signal by a mixer. Then, an output from the mixer is input to the filter, amplified by an amplifier, and output to a demodulation circuit as shown in Patent documents 1 and 2, for example.

[Patent Document 1] Japanese Patent Application Laid-Open No. 2009-058485

[Patent Document 2] Japanese Patent Application Laid-Open No. 2009-016912

In some cases, noise can occur in the output signal due to an area where the broadcast program is watched, an environment where the antenna is installed in a house, and influence of radiation from peripheral devices. If the noise occurs in the output signal, noise images are generated on a screen output by an output device (e.g., display panel). This adversely affects viewing of the broadcast program.

The present invention provides a receiver that can improve a quality of the output signal.

BRIEF SUMMARY OF THE INVENTION

One aspect of the present invention provides a tuning circuit that outputs an output signal corresponding to a selected channel from a broadcast signal, comprising: a first band-pass filter that passes a first predetermined frequency band corresponding to the selected channel in the broadcast signal; a mixing circuit that generates a mixed signal by mixing a signal having a predetermined frequency band corresponding to the selected channel with the broadcast signal passed through the first band-pass filter; and a second band-pass filter that passes a second predetermined frequency band in the mixed signal, wherein at least one of a first frequency of the first band-pass filter and a second frequency of the second band-pass filter of the selected channel is changed.

In another aspect of the present invention, at least one of a first adjustment portion that specifies the first frequency of the first band-pass filter and a second adjustment portion that specifies the second frequency of the second band-pass filter is provided.

In another aspect of the present invention, the first adjustment portion and the second adjustment portion adjust the first frequency and the second frequency to make an evaluation value of an output signal output from the second band-pass filter become a predetermined value.

The first and the second band-pass filters can be any band-pass filter as long as it can change a predetermined frequency pass band with a center frequency as a reference.

The evaluation value is a value by which the output signal can be evaluated. A C/N ratio (Carrier to noise ratio), a BER (Bit Error Rate), and a combination of them can be used as the evaluation value. The C/N ratio means a power ratio between a carrier C and a noise N in the output signal. The BER is a value showing an error rate of the output signal.

The predetermined value can be a value exceeding a preliminarily determined optimal value (threshold value), a best value in a plurality of measurement, and an average value of a plurality of measurement.

The first adjustment portion and the second adjustment portion can acquire the evaluation value of the externally detected output signal or calculate the evaluation value from the output signal received by the first adjustment portion.

The signal passed through the second band-pass filter is output from a predetermined output circuit. The output circuit is a general term of a circuit for amplifying, demodulating and error-correcting the signal passed through the second band-pass filter.

The first adjustment portion adjusts the first frequency (frequency pass band) of the first variable band-pass filter to make the evaluation value of the output signal of the first variable band-pass filter become a predetermined value. The second adjustment portion adjusts the second frequency (frequency pass band) of the second variable band-pass filter to make the evaluation value of the output signal of the second variable band-pass filter become a predetermined value. Therefore, the noise component can be efficiently removed from the input signal. Thus, the quality (e.g., image quality) of the program to be viewed can be improved.

DETAILED DESCRIPTION OF THE INVENTION

Hereafter, embodiments of the present invention will be explained according to the following order.
1. First embodiment:
(1) Configuration of receiver
(2) Configuration of tuning circuit
(3) Method of improving quality
2. Second embodiment:
3. Third embodiment:
4. Fourth embodiment:
5. Other embodiments:

1. First Embodiment

(1) Configuration of Receiver

Figure 1:
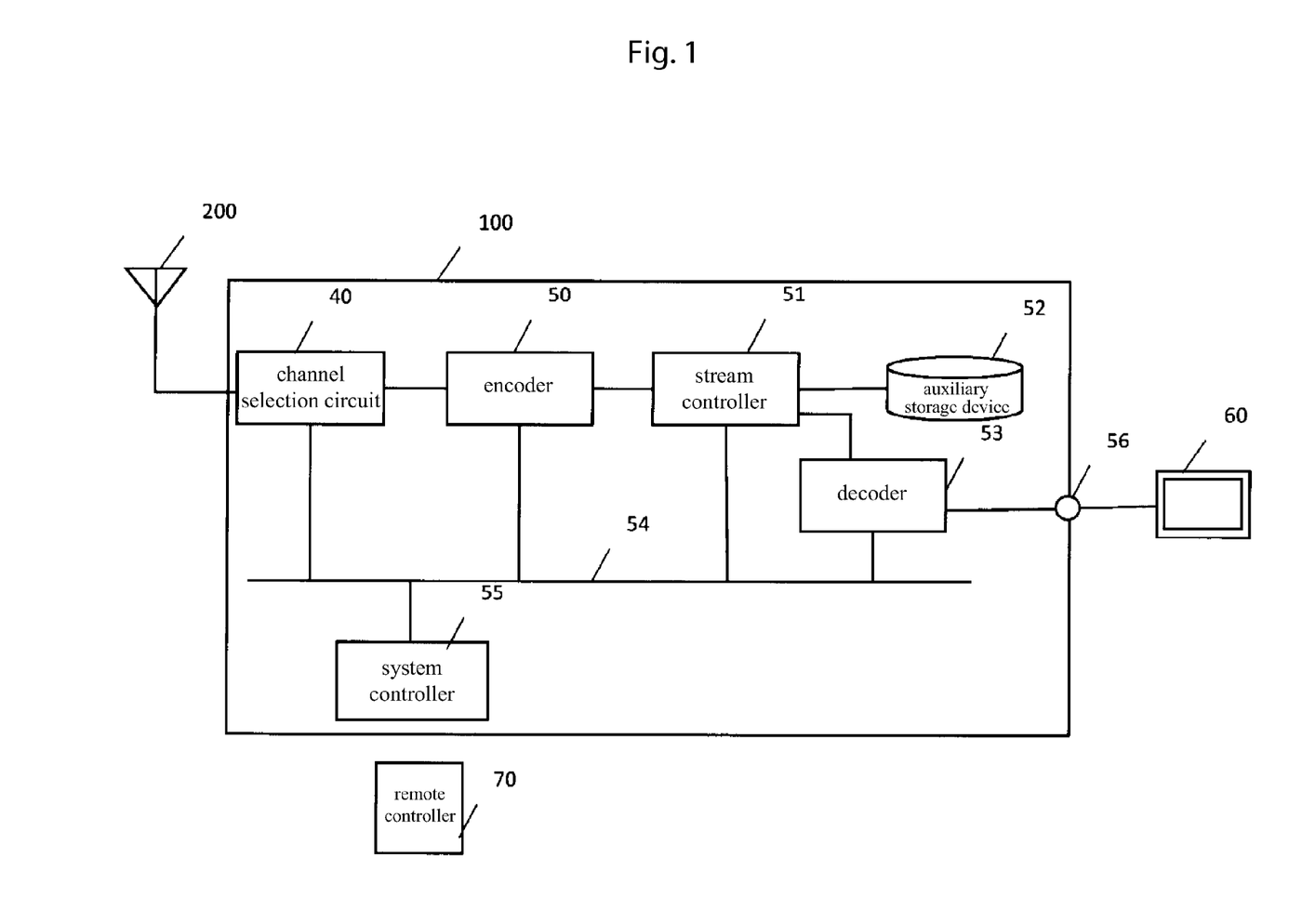
FIG. 1 is a block diagram showing a receiver 100 as an example.

FIG. 1 is a block diagram showing a receiver 100 as an example. The receiver 100 shown in FIG. 1 is a recording device having a tuning circuit 40. The tuning circuit 40 is connected to an antenna 200. The tuning circuit 40 extracts a signal (TS packet) corresponding to the selected channel from the television radio wave received by the antenna 200. In other words, the tuning circuit 40 outputs the output signal corresponding to the selected channel from the broadcast signal. The TS packet is comprised of image and sound of the selected channel and program information. Note that the specific configuration of the tuning circuit 40 will be explained later.

An encoder 50 is connected to an output side of the tuning circuit 40. The encoder 50 encodes the signal output from the tuning circuit 40. A stream controller 51 is connected to an output side of the encoder 50. The stream controller 51 records the TS packet encoded by the encoder 50 in a storage area of an auxiliary storage device 52. The auxiliary storage device 52 can be magnetic storage devices such as an HDD, semiconductor storage devices such as an SSD (solid state drive) and optical discs such as a DVD and a BD. A decoder 53 is connected to the stream controller 51. When reproducing the TS packet recorded in the auxiliary storage device 52, the stream controller 51 outputs the TS packet to the decoder 53. The decoder 53 decodes the read TS packet and outputs it via an output terminal 56. A display device 60, which functions as an output device, can be connected to the output terminal 56. The display device 60 outputs the signal received via the output terminal 56 as image and sound.

Each components of the receiver 100 is connected to a system controller 55 via a bus 54. The system controller 55 includes not illustrated CPU, ROM and RAM. The system controller 55 expands programs recorded in the ROM to the RAM and executes them. Thus, the system controller can control driving of the receiver 100 such as tuning executed by the tuning circuit 40 and recording of the TS packet. In addition, the system controller 55 can receive operation commands from a remote controller 70. When a user operates the remote controller 70, the system controller 55 controls the tuning circuit 40 via the bus 54 to select the channel.

(2) Configuration of Tuning Circuit

Figure 2:
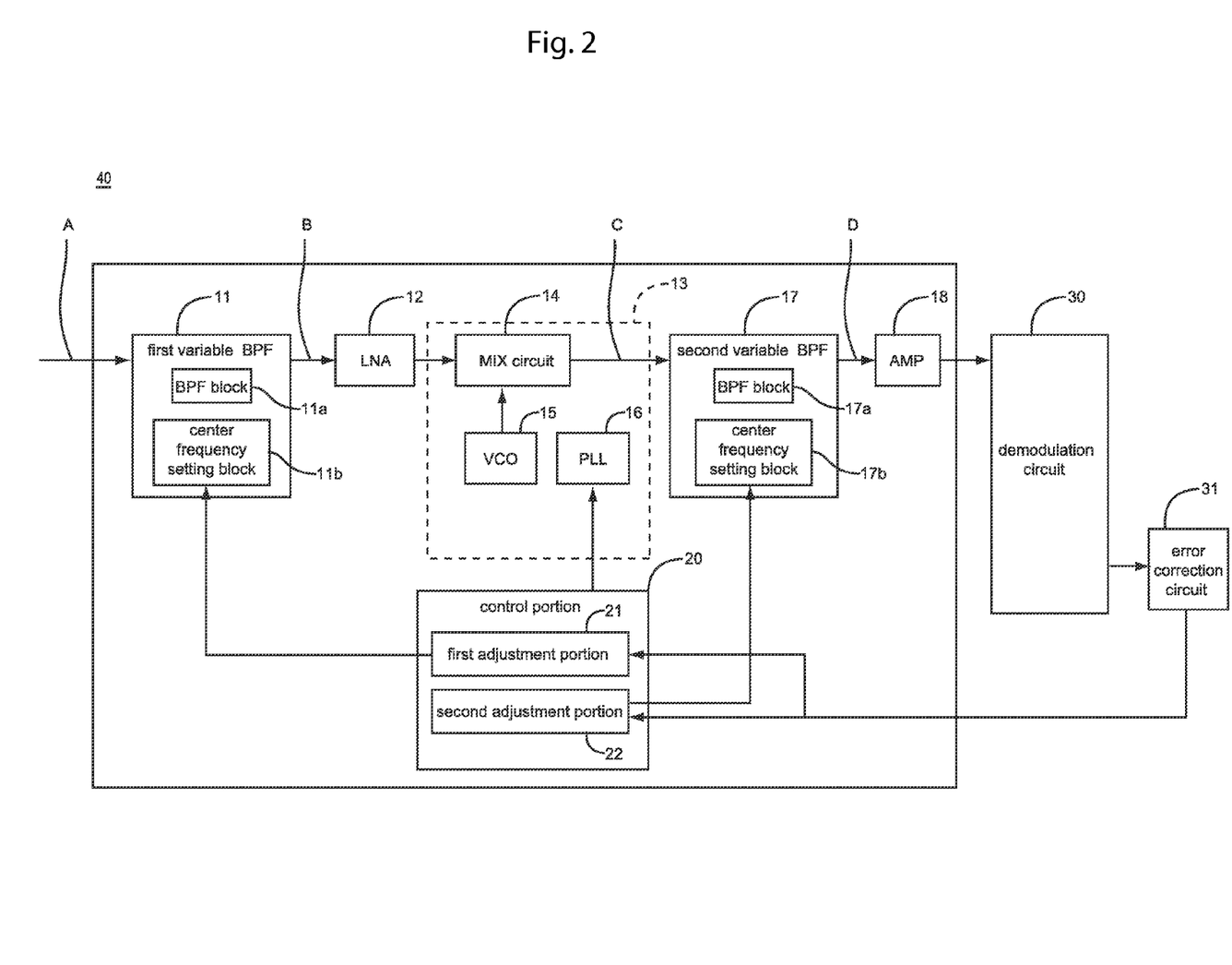
FIG. 2 is a block diagram showing a tuning circuit 40 as an example.

Next, the configuration of the tuning circuit 40 will be explained in detail. FIG. 2 is a block diagram showing the tuning circuit 40 as an example. The tuning circuit 40 performs the tuning processing using the superheterodyne method. Namely, the tuning circuit 40 synthesizes an RF signal with a local signal and extracts a mixed signal (TS packet) corresponding to the selected channel. The tuning circuit 40 shown in FIG. 2 includes a tuner 10, a demodulation circuit 30 and an error correction circuit 31. The tuner 10 extracts the signal of the channel (band) selected by the tuning in the television radio wave received by the antenna 200. The demodulation circuit 30 demodulates the signal extracted by the tuner 10. The error correction circuit 31 corrects errors of the signal demodulated by the demodulation circuit 30.

Figure 3A:
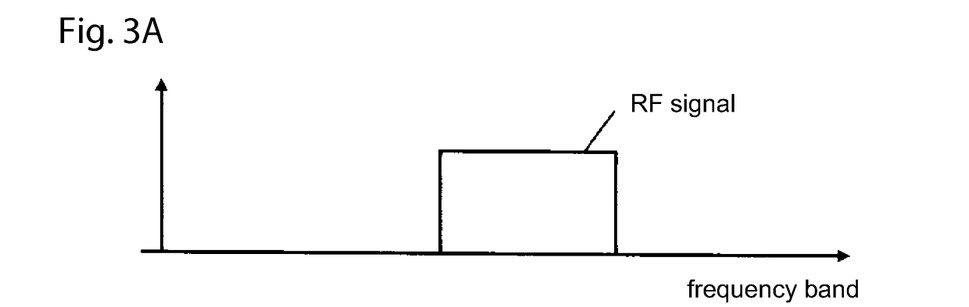
FIGS. 3A to 3D are diagrams explaining a change of a signal generated in the tuning circuit 40.
Figure 3B:
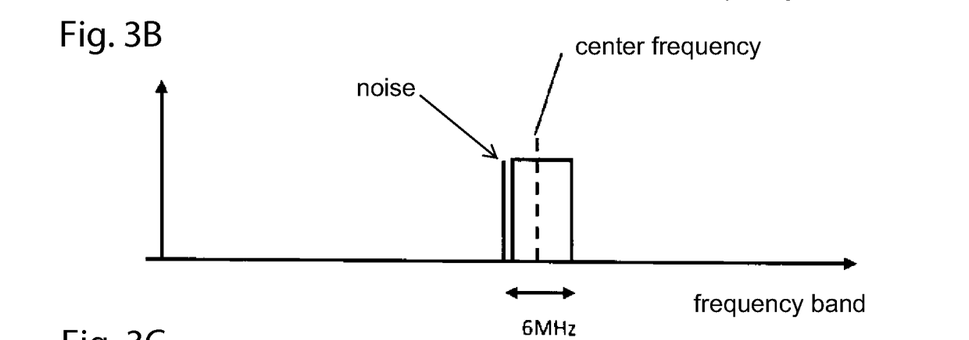
Figure 3C:
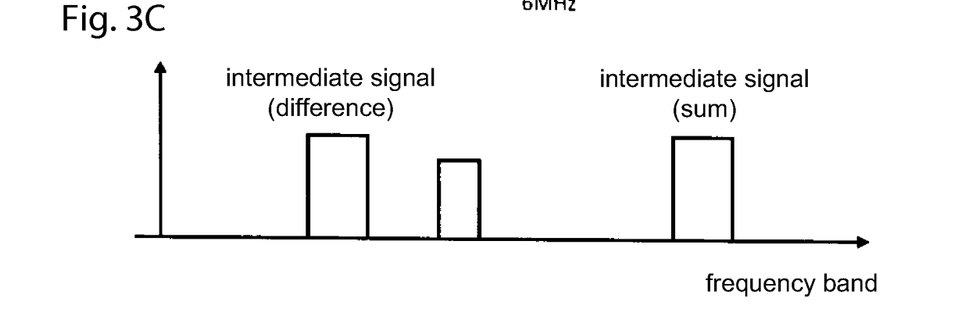
Figure 3D:
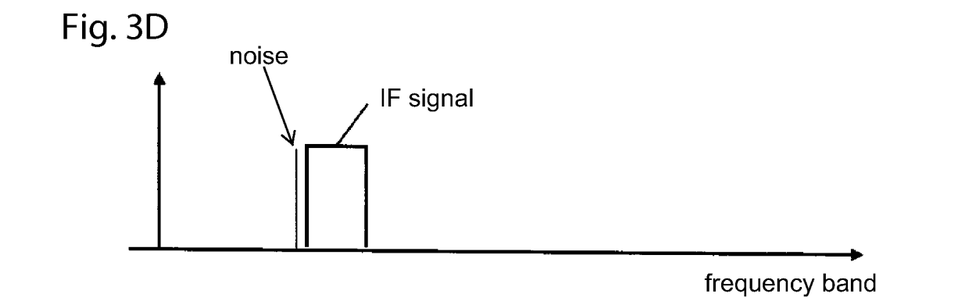

FIGS. 3A to 3D are diagrams explaining a change of the signal generated in the tuning circuit 40. FIG. 3A shows an input signal (RF signal) at a point A of FIG. 2. FIG. 3B shows the signal at a point B of FIG. 2. FIG. 3C shows the signal at a point C of FIG. 2. FIG. 3D shows the signal at a point D of FIG. 2.

The configuration of the tuner 10 shown in FIG. 2 will be explained. A first variable band-pass filter 11 is connected to an input terminal. Hereafter, the first variable band-pass filter 11 will be also referred to as a first variable BPF 11. A frequency pass band of the first variable band-pass filter 11 is, for example, set to 6 MHz with a center frequency as a reference. In the RF signal (FIG. 3A) passing through the first variable BPF 11, only the frequency component that belongs to the frequency pass band of 6 MHz with the center frequency as the center is passed, and the frequency component of other bands is attenuated (FIG. 3B). Note that, in FIG. 3B, a noise is included in the lowest frequency of the frequency pass band. The first variable BPF 11 includes a BPF block 11a and a center frequency setting block 11b. The BPF block 11a passes only the frequency pass band located above and below a predetermined center frequency. The center frequency setting block 11b specifies the center frequency. By shifting the center frequency above and below (also expressed as back and forth) according to the frequency of the selected channel selected in the tuning, a predetermined frequency pass band can be changed. As explained above, the first band-pass filter 11 passes the frequency band corresponding to the selected channel from the broadcast signal.

A mixing circuit 13 is connected to an output side of the first variable BPF 11 via an LNA 12. The LNA 12 applies low noise amplification to the RF signal passed through the first variable BPF 11.

The mixing circuit 13 mixes the local signal corresponding to the selected channel with the RF signal passed through the first variable BPF 11 to generate a mixed signal. The mixing circuit 13 shown in FIG. 2 includes a VCO 15, a PLL 16 and a MIX circuit 14. The VCO 15 generates the local signal corresponding to the selected channel. The PLL 16 specifies the frequency band of the VCO 15. The MIX circuit 14 synthesizes the local signal with the RF signal output from the LNA 12. According to the control signal sent from a later mentioned control portion 20, the PLL 16 specifies the frequency band corresponding to the selected channel.

As shown in FIG. 3C, from the RF signal mixed with the local signal by the mixing circuit 13, the mixed signals having the frequency of sum and difference of the RF signal and the local signal are generated.

A second variable band-pass filter 17 is connected to an output side of the mixing circuit 13. In the mixed signal containing a low frequency component (difference) and a high frequency component (sum), the second variable band-pass filter 17 passes only the low frequency component and attenuates other bands. The second variable BPF 17 includes a BPF block 17a and a center frequency setting block 17b. The BPF block 17a passes only the frequency pass band located above and below a predetermined center frequency. The center frequency setting block 17b specifies the center frequency. The center frequency and the frequency pass band of the second variable BPF 17 are set individually for each selected channel. Therefore, as shown in FIG. 3D, only the low frequency component in the mixed signal passes through the second variable BPF 17 and the high frequency component is attenuated. A width of the pass band of the second variable band-pass filter 17 is set to 6 MHz, for example. Note that, in FIG. 3D, a noise is included in the lowest frequency of the frequency pass band. As explained above, the second band-pass filter 17 passes a predetermined frequency band of the mixed signal.

An AMP (amplifier) 18 is connected to an output side of the second variable BPF 17. The AMP 18 amplifies the mixed signal passed through the second variable BPF 17.

The demodulation circuit 30 is connected to an output side of the AMP 18. The demodulation circuit 30 demodulates the mixed signal output from the AMP 18 and generates an IF signal (output signal). The error correction circuit 31 is connected to the demodulation circuit 30. The error correction circuit 31 corrects errors of the IF signal demodulated by the demodulation circuit 30. In addition, the error correction circuit 31 calculates a C/N ratio and a BER as an evaluation value evaluating a reception state. The error correction circuit 31 is connected to the control portion 20. The error correction circuit 31 outputs the evaluation value to the control portion 20. In this embodiment, the error correction circuit 31 outputs the evaluation value. Although the demodulation circuit 30 can be used for outputting the evaluation value, other evaluation value calculating circuits can be used instead.

The control portion 20 applies the frequency band of the VCO signal corresponding to the selected channel to the mixing circuit 13. In addition, the control portion 20 performs a feedback control of the first variable band-pass filter 11 and the second variable band-pass filter 17 based on the evaluation value output from the error correction circuit 31. Specifically, the control portion 20 adjusts the frequency pass bands of the first variable band-pass filter 11 and the second variable band-pass filter 17 according to the output of the error correction circuit 31. The control portion 20 shown in FIG. 2 includes a first adjustment portion 21 and a second adjustment portion 22. The first adjustment portion 21 adjusts the first frequency and the frequency pass band of the first variable BPF 11 to make the C/N ratio obtained as the evaluation value become an optimum value. The second adjustment portion 22 adjusts the second frequency and the frequency pass band of the second variable BPF 17 to make the BER obtained as the evaluation value become an optimum value.

Figure 4A:
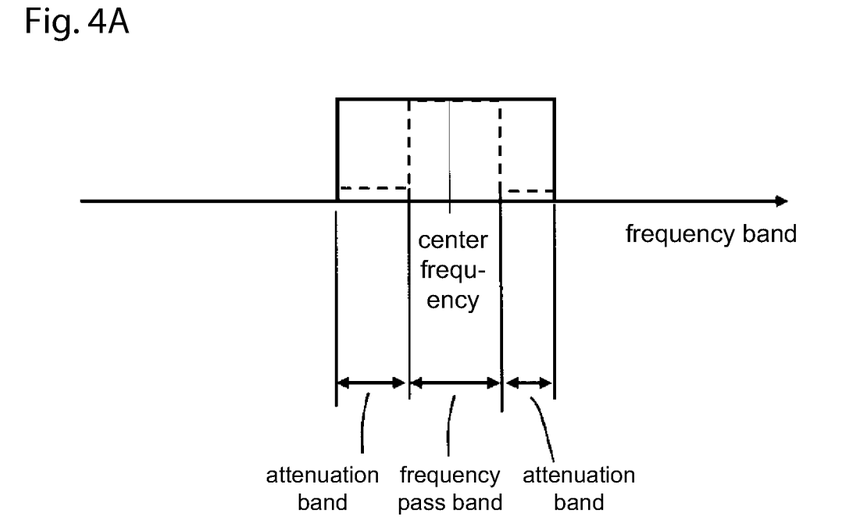
FIGS. 4A to 4C are diagrams explaining a process of improving quality of an IF signal by using a first adjustment portion 21 and a second adjustment portion 22.
Figure 4B:
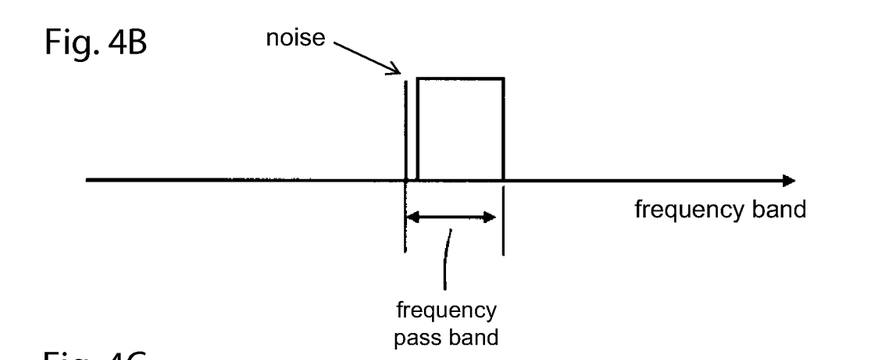
Figure 4C:
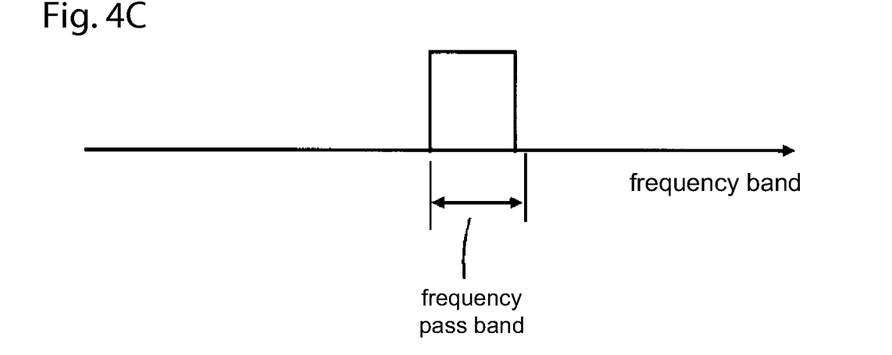

FIGS. 4A to 4C are diagrams explaining a process of improving quality of the IF signal by using the first adjustment portion 21 and the second adjustment portion 22. FIG. 4A is a diagram showing a relation between a frequency pass band and an attenuation band of the first BPF 11 as an example. The frequency band in a predetermined range above and below the center frequency is the frequency pass band. The frequency band above or below the frequency pass band is an attenuation band. In the attenuation band, the frequency component is gradually attenuated. Above or below the attenuation band, the frequency component is almost completely blocked. FIG. 4B is a diagram showing the signal (signal passed through the first variable BPF 11) on which the noise is superposed. FIG. 4C is a diagram showing the signal (signal passed through the first variable BPF 11) on which the noise is not superposed.

As shown in FIG. 4A, in the RF signal passing through the first BPF 11, the frequency pass band is passed and the signal is attenuated in the attenuation band. In FIG. 4B, noise is superposed on the signal of the frequency pass band of the first BPF 11. If the noise is superposed on the signal, quality of the IF signal, which is generated later, is deteriorated. Therefore, the first adjustment portion 21 adjusts the center frequency and the frequency pass band of the first BPF 11 back and forth, and the band on which the noise is superposed is set to be the attenuation band of the first BPF 11. Thus, the noise can be reduced and the quality of the IF signal can be improved. In FIG. 4C, the noise is attenuated in the attenuation band by shifting the frequency pass band of the first BPF 11 to the high frequency side. Specifically, as shown in FIG. 4B, when the noise is generated at a slightly lower frequency side of the frequency pass band, the noise can be included in the attenuation band by slightly shifting the center frequency to the high frequency side. As a result, as shown in FIG. 4C, the signal on which the noise is not superposed can be obtained. In addition, since the noise is not superposed, the evaluation value is improved as explained later. In other words, if the center frequency is specified so that the evaluation value is improved, the noise can be prevented from being superposed. The center frequency can be specified so that the evaluation value becomes the optimum value or the evaluation value exceeds a predetermined threshold value. In other words, whether the evaluation value is improved or not should be judged by comparing the evaluation value with an index value.

Similarly, also in the second BPF 17, the quality of the IF signal can be improved by adjusting the frequency pass band and attenuating the noise.

As explained above, the first adjustment portion 21 and the second adjustment portion 22 adjust the first frequency and the second frequency to make the evaluation value of the output signal output from the first and second band-pass filters 11, 17 become a predetermined value.

(3) Method of Improving Quality

Next, a method of improving quality using the tuning circuit 40 will be explained.

In the first embodiment, the control portion 20 performs a process of improving quality each time when the user operates the remote controller 70 to select the channel. By the process of improving quality, the noise component of the IF signal is reduced and the quality of the output of the display device 60 can be improved.

Figure 5:
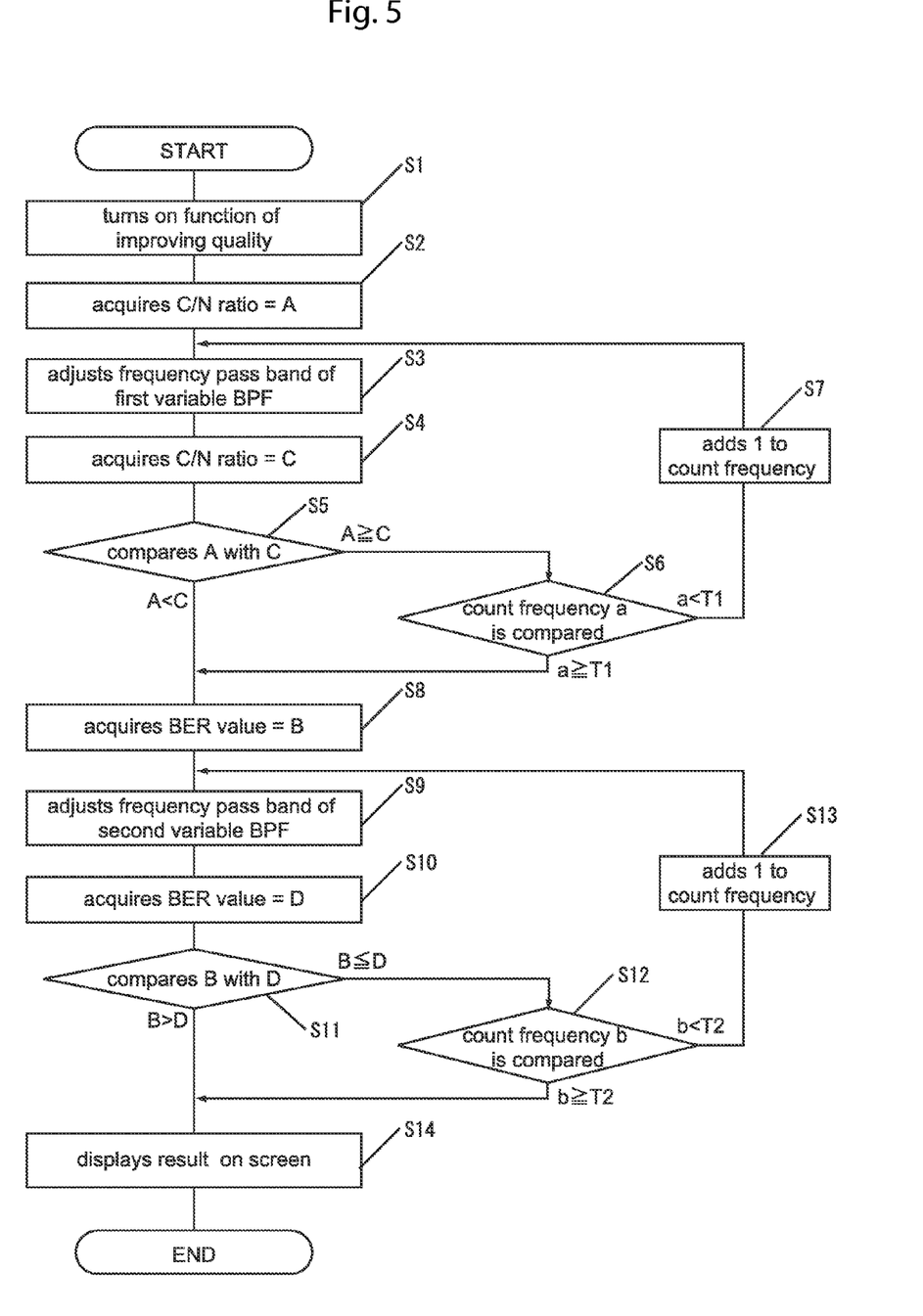
FIG. 5 is a flow chart explaining a change of the signal changed in the process in FIG. 4.

FIG. 5 is a flow chart explaining the process of improving quality performed by the tuning circuit 40.

In step S1 of FIG. 5, the control portion 20 turns on the function of improving quality of the RF signal, and the procedure advances to step S2.

In step S2, the control portion 20 (first adjustment portion 21) specifies the frequency pass band (initial value) corresponding to the selected channel and acquires an initial value A of the C/N ratio of the IF signal. The C/N ratio can be acquired from the error correction circuit 31, for example. For example, the control portion 20 stores the center frequency and the frequency pass band for each channel to be selected. When the signal of the channel selected by the user is received via the system controller 55, the control portion 20 applies the frequency pass band corresponding to the selected channel to the mixing circuit 13. Note that the control portion 20 only needs to record at least either of the center frequency and the frequency pass band for each channel to be selected.

In step S3, the control portion 20 changes the frequency pass band of the first variable BPF 11. As shown in FIG. 4A, the control portion 20 minutely changes the center frequency of the frequency pass band to change the frequency pass band of the first variable BPF 11. Specifically, when the control portion 20 changes the center frequency of the first variable BPF 11, the frequency pass band is changed. Hereafter, the process that the control portion 20 changes the frequency pass band of the first variable BPF 11 is also referred to as "the control portion 20 adjusts the frequency pass band of the first variable BPF 11." In step S4, the control portion 20 acquires a C/N ratio C of the IF signal, which is acquired by the frequency pass band after the adjustment.

In step S5, the control portion 20 compares the initial value A with the C/N ratio C and judges whether or not the C/N ratio is improved. If the initial value A is lower than the acquired C/N ratio C, the C/N ratio is improved. Therefore, the control portion 20 finishes the adjustment of the first BPF 11, and the procedure advances to step S8. On the other hand, if the initial value A is higher than the C/N ratio C, the C/N ratio is not improved. Therefore, the procedure advances to step S6.

In step S6, the control portion 20 refers to a count frequency a, which is the number of times of adjusting the frequency pass band. In the first embodiment, the control portion 20 finishes the adjustment of the frequency pass band of the first variable band-pass filter 11 when the count frequency a is equal to or more than a threshold value T1 (e.g. T1=10). Here, since the count frequency a is less than the threshold value T1, the procedure advances to step S7.

In step S7, the control portion 20 adds 1 to the count frequency a, and the procedure returns to step S3.

After returned to step S3, the control portion 20 adjusts the frequency pass band of the first variable BPF 11. In step S4, the control portion 20 acquires the C/N ratio C after the adjustment. Then, the control portion 20 compares the initial value A with the C/N ratio C of the IF signal after the frequency pass band is adjusted. If the C/N ratio is not improved (A≥C), the procedure returns to steps S6.

In step S6, if the count frequency a is equal to or more than the threshold value (step S6: a≥T1), the procedure advances to step S8.

In other words, the center frequency is further changed when the evaluation value is improved. On the other hand, the setting of the center frequency is finished when the evaluation value is not improved so as not to further deteriorate the evaluation value.

As another method, a target center frequency can be stored and the target center frequency can be revised by applying the current first frequency as a candidate for the target center frequency only when the evaluation value is improved. Then, steps S3 to S7 are repeated. In this way, when the loop of the above procedures is finished, the evaluation value is improved the most when the target center frequency is applied.

In the above described process, the first adjustment portion 21 acquires the evaluation value corresponding to the changed first frequency after the first frequency is changed, and the first adjustment portion 21 applies the changed first frequency to the first band-pass filter 11 when the evaluation value is improved.

In the above described process, the evaluation value is a carrier/noise ratio. The first adjustment portion 21 uses the carrier/noise ratio as the evaluation value.

In step S8, the control portion 20 specifies the center frequency and the frequency pass band of the second variable BPF 17 corresponding to the selected channel, and acquires an initial value B of a BER value.

In step S9, the control portion 20 adjusts the frequency pass band of the second variable BPF 17. In step S9, the control portion 20 increases and decreases the center frequency of the frequency pass band of the second variable BPF 17 to adjust the frequency pass band. Note that the control portion 20 only needs to record at least either of the center frequency and the frequency pass band for each channel to be selected.

In step S10, the control portion 20 acquires a BER value D of the IF signal, which is acquired by the frequency pass band after the adjustment.

In step S11, the control portion 20 compares the initial value B with the BER value D and judges whether or not the BER value is improved. If the BER value D is improved (B>D), the procedure advances to steps S14. On the other hand, if the BER value D is not improved (B≤D), the procedure advances to steps S12.

In step S12, the control portion 20 refers to a count frequency b, which is the number of times of adjusting the frequency pass band. In the first embodiment, the control portion 20 finishes the adjustment of the frequency pass band of the second variable band-pass filter 17 when the count frequency b is equal to or more than a threshold value T2 (e.g. T2=10). Here, since the count frequency b is less than the threshold value T2, the procedure advances to step S13. In step S13, the control portion 20 adds 1 to the count frequency b.

After returned to step S9, the control portion 20 changes the frequency pass band of the second variable BPF 17. In step S10, the control portion 20 acquires the BER value D of the IF signal after the frequency pass band is changed. If the BER value is improved (step S12: B>D) or the count frequency b is equal to or more than the threshold value T2 (step S13: b≥T2), the procedure advances to step S14.

In other words, the center frequency is further changed when the evaluation value is improved. On the other hand, the setting of the center frequency is finished when the evaluation value is not improved so as not to further deteriorate the evaluation value.

As another method, the center frequency of the second variable BPF 17 can be stored each time when the evaluation value is improved. In this way, the finally stored center frequency can be the target center frequency. Specifically, the target center frequency can be stored and the target center frequency can be revised by applying the current first frequency as a candidate for the target center frequency only when the evaluation value is improved. Then, steps S10 to S13 are repeated. In this way, when the loop of the above procedures is finished, the evaluation value is improved the most when the target center frequency is applied.

In the above described process, the second adjustment portion 22 acquires the evaluation value corresponding to the changed second frequency after the first frequency is changed, and the second adjustment portion 22 applies the changed second frequency to the second band-pass filter 17 when the evaluation value is improved.

In the above described process, the evaluation value is a bit error rate. The second adjustment portion 22 uses the bit error rate as the evaluation value.

Figure 6:
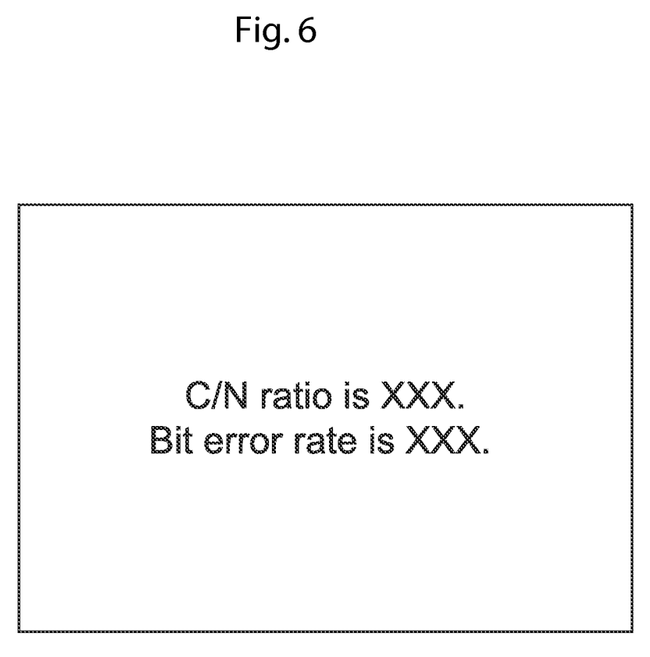
FIG. 6 is a diagram showing an OSD screen displayed on a display device 60 as an example.

In step S14, the control portion 20 displays the result of improvement of the C/N ratio and the BER value on a screen. FIG. 6 shows an OSD screen displayed on the display device 60 as an example. In the OSD screen shown in FIG. 6, both the C/N ratio and the BER value after improving the quality are displayed on the screen.

Therefore, the process of step S14 corresponds to a display portion that displays the evaluation values acquired after the first frequency and the second frequency are adjusted.

As explained above, in the first embodiment, after the first adjustment portion 21 adjusts the first frequency pass band of the first variable band-pass filter 11 to make the C/N ratio of the IF signal become an optimum value, the second adjustment portion 22 adjusts the second frequency pass band of the second variable band-pass filter 17 to make the BER of the IF signal become an optimum value. Therefore, the noise component can be efficiently removed from the IF signal and the quality (e.g., image quality) of the program to be viewed can be improved.

The first adjustment portion 21 uses the carrier/noise ratio as the evaluation value, and the second adjustment portion 22 uses the bit error rate as the evaluation value. Since the quality of the IF signal can be evaluated by using the different evaluation values, the quality can be further improved. Thus, the evaluation value used in the first adjustment portion 21 is different from the evaluation value used in the second adjustment portion 22. Namely, a kind of the evaluation value used is different between the first adjustment portion and the second adjustment portion.

Since the first adjustment portion 21 and the second adjustment portion 22 adjust the frequency pass bands of the first BPF 11 and the second BPF 17 each time when the channel is selected, adequate quality of the output signal is maintained when the channel is selected. In other words, the first adjustment portion 21 and the second adjustment portion 22 adjust the first frequency and the second frequency when the channel is selected.

2. Second Embodiment

Figure 7:
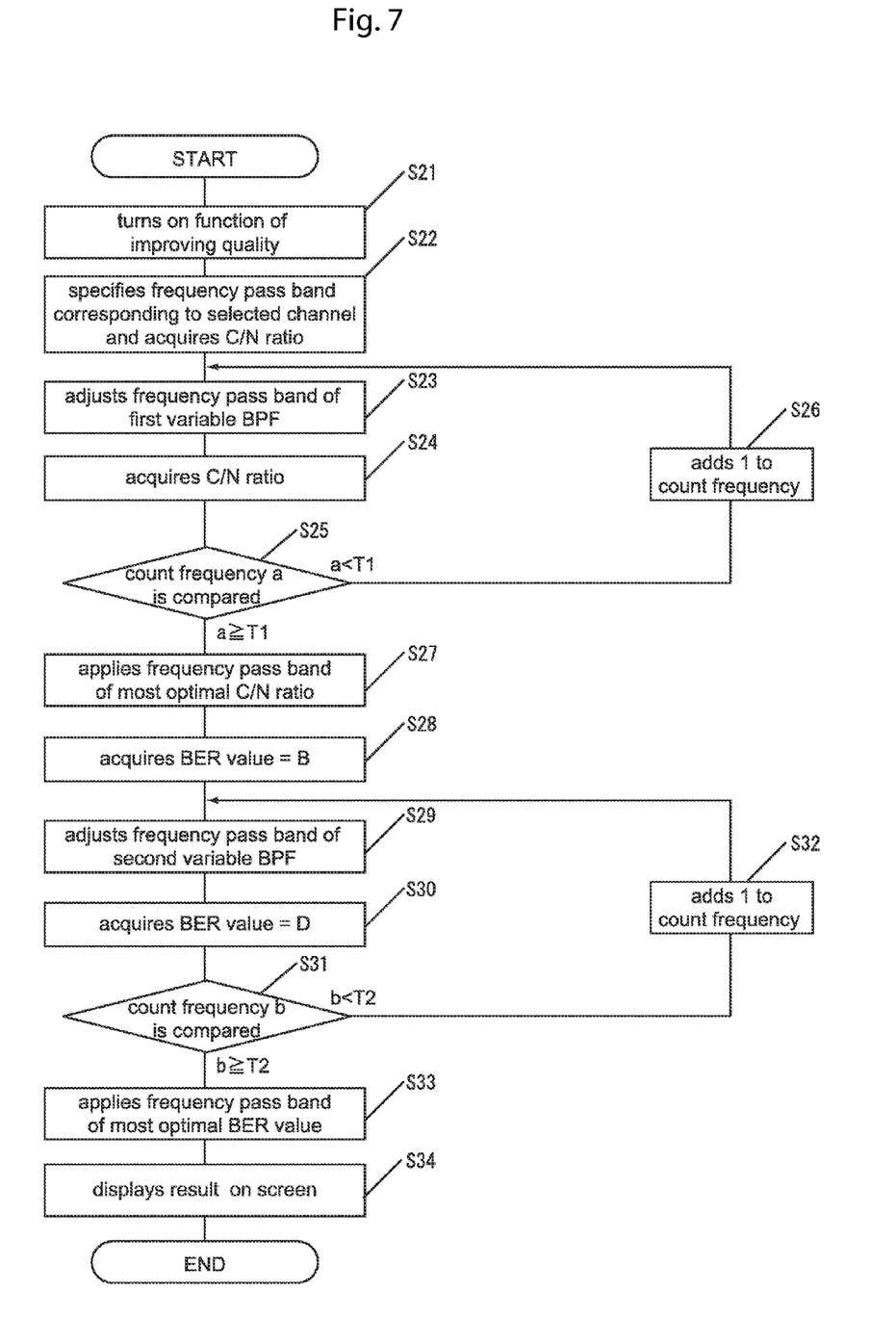
FIG. 7 is a flow chart explaining a process of improving quality executed by the tuning circuit 40 in the second embodiment.

FIG. 7 is a flow chart explaining a process of improving quality executed by the tuning circuit 40 in the second embodiment. Also in the second embodiment, the frequency pass bands of the first BPF 11 and the second BPF 17 are adjusted based on the C/N ratio and the BER value of the IF signal.

In step S21 of FIG. 7, the control portion 20 turns on the function of improving quality of the RF signal, and the procedure advances to step S22.

In step S22, the control portion 20 specifies the frequency pass band corresponding to the selected channel and acquires a C/N ratio Ci of the IF signal. In the above, "i" is a value of identifying the acquired C/N ratio. Here, since the C/N ratio is acquired for the first time, i=0. Also in the second embodiment, the control portion 20 stores the center frequency and the frequency pass band for each channel to be selected.

In step S23, the control portion 20 adjusts the frequency pass band of the first variable BPF 11. In step S24, the control portion 20 acquires the C/N ratio Ci of the IF signal.

In step S25, the control portion 20 refers to the count frequency a, which is the number of times of adjusting the frequency pass band. In the second embodiment, the control portion 20 finishes the adjustment of the frequency pass band of the first variable BPF 11 when the count frequency a is equal to or more than the threshold value T1.

Here, since the count frequency a is less than the threshold value T1 (e.g. 10), the procedure advances to step S26.

In step S26, the control portion 20 adds 1 to the count frequency a, and the procedure returns to step S23.

In step S23, the control portion 20 adjusts the frequency pass band of the first variable BPF 11. In step S24, the control portion 20 acquires the C/N ratio Ci after the adjustment.

In step S25, if the count frequency a is equal to or more than the threshold value T1 (step S25: a≥T1), the procedure advances to step S27.

In step S27, the control portion 20 determines the most optimal C/N ratio Ci from the acquired C/N ratios Ci and applies the frequency pass band corresponding to the most optimal C/N ratio Ci to the first BPF 11. For example, if the C/N ratios C0 to CT1 are stored and the C/N ratio Ci is the most optimal value, the center frequency when the C/N ratio Ci is acquired is applied to the center frequency of the first BPF 11. This center frequency can be calculated as the frequency that is adjusted i times from the initial value.

In the above described process, the center frequency corresponding to the most optimal evaluation value is calculated. Therefore, the first frequency is changed and the evaluation values corresponding to each of the changed first frequency are acquired. Then, the most optimal evaluation value is selected from the acquired evaluation values and the center frequency corresponding to the most optimal evaluation value is applied to the first frequency of the first band-pass filter. Of course, the evaluation value to be selected is not limited to the most optimal value. For example, the evaluation value exceeding a predetermined value or the evaluation value equal to a predetermined value can be selected instead.

In step S28, the control portion 20 acquires the BER value Dj of the IF signal. In the above, "j" is a value of identifying the acquired BER value. Here, since the BER value is acquired for the first time, j=0. Also in the second embodiment, the control portion 20 stores the center frequency and the frequency pass band for each channel to be selected.

In step S29, the control portion 20 adjusts the frequency pass band of the second variable BPF 17. In step S29, the control portion 20 increases and decreases the center frequency of the frequency pass band of the second variable BPF 17 to adjust the frequency pass band.

In step S30, the control portion 20 acquires the BER value Dj of the IF signal, which is acquired by the frequency pass band after the adjustment.

In step S31, the control portion 20 refers to the count frequency b, which is the number of times of adjusting the frequency pass band. In the second embodiment, the control portion 20 finishes the adjustment of the frequency pass band of the second variable band-pass filter 17 when the count frequency b is equal to or more than the threshold value T2 (e.g., T2=10). Here, since the count frequency b is less than the threshold value T2, the procedure advances to step S32. In step S32, the control portion 20 adds 1 to the count frequency b.

After returned to step S29, the control portion 20 adjusts the frequency pass band of the second variable BPF 17. In step S30, the control portion 20 acquires the BER value Dj of the IF signal after the frequency pass band is adjusted.

If the count frequency b is equal to or more than the threshold value T2 (step S21: b≥T2), the procedure advances to step S33.

In step S33, the control portion 20 determines the most optimal BER value from the acquired BER values Dj and applies the frequency pass band corresponding to the most optimal BER value to the second BPF 17.

In the above described process, the center frequency corresponding to the most optimal evaluation value is calculated. Therefore, the second frequency is changed and the evaluation values corresponding to each of the changed second frequency are acquired. Then, the most optimal evaluation value is selected from the acquired evaluation values and the center frequency corresponding to the most optimal evaluation value is applied to the second frequency of the second band-pass filter. Of course, the evaluation value to be selected is not limited to the most optimal value. For example, the evaluation value exceeding a predetermined value or the evaluation value equal to a predetermined value can be selected instead.

In step S34, the control portion 20 displays the result of improvement of the C/N ratio and the BER value on a screen. Therefore, both the C/N ratio and the BER value after improving the quality are displayed on the display device 60.

In the second embodiment, all of the C/N ratios and the BER values are stored when the center frequency is gradually changed. Therefore, the value that appears as a peak suddenly can be ignored by judging that the value is influenced by the noise. In addition, a representative value not influenced by the noise can be used by calculating an average value of three continuous values. The method of calculating the representative value is not limited to the above method. Various methods can be used instead.

As explained above, without individually evaluating the evaluation value when the center frequency is changed, a plurality of evaluation values can be simultaneously used for evaluating the evaluation value. In the above described embodiment, the first adjustment portion 21 and the second adjustment portion 22 change the first frequency and the second frequency, and then acquire the evaluation values corresponding to the changed first frequency and second frequency. Then, the first adjustment portion 21 and the second adjustment portion 22 select a representative evaluation value from the acquired evaluation values based on a plurality of evaluation values, and apply the center frequency corresponding to the representative evaluation value to the first frequency of the first band-pass filter 11 or the second frequency of the second band-pass filter 17.

As explained above, in the second embodiment, same effect as the first embodiment can be obtained.

3. Third Embodiment

In the third embodiment, the frequency pass band explained in the first embodiment and the second embodiment is stored for each channel, and the frequency pass band corresponding to the selected channel is applied when the channel is selected.

Figure 8:
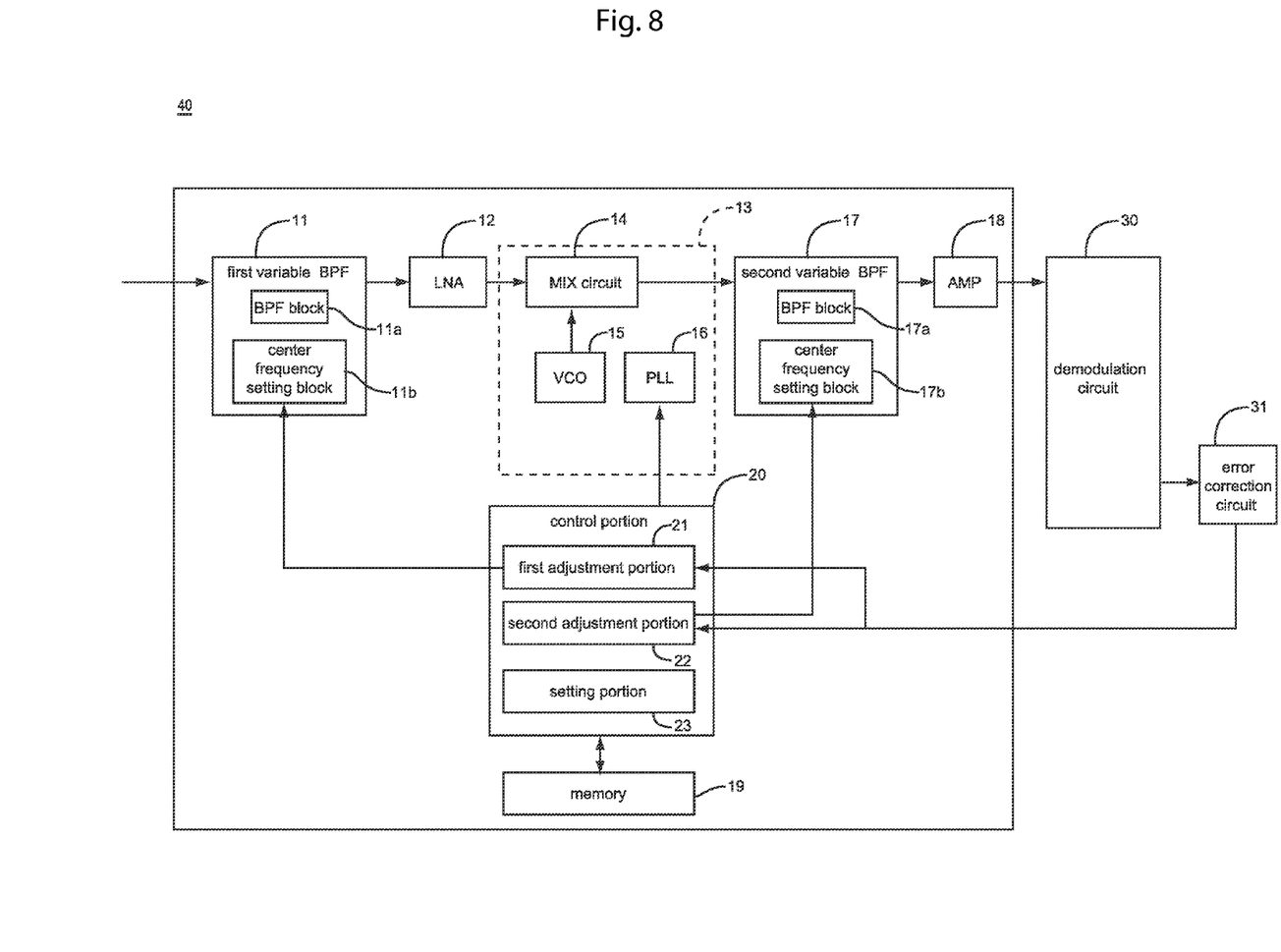
FIG. 8 is a block diagram showing the tuning circuit of the third embodiment.

FIG. 8 is a block diagram showing the tuning circuit of the third embodiment.

The tuning circuit 40 shown in FIG. 8 includes a memory (storage portion) 19 in addition to the first BPF 11, the LNA 12, the mixing circuit 13, the second BPF 17, AMP 18, the control portion 20 and the demodulation circuit 30. The control portion 20 functionally includes a setting portion 23 in addition to the first adjustment portion 21 and the second adjustment portion 22.

Figure 9:
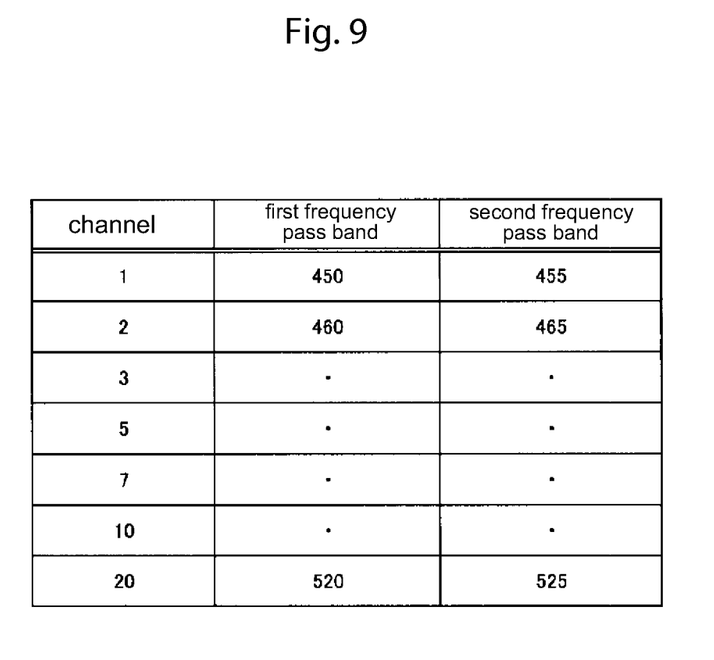
FIG. 9 is a diagram explaining a frequency pass band stored in a memory 19.

The memory 19 stores the center frequency and the frequency pass band (first frequency pass band) of the first BPF 11 and the center frequency and the frequency pass band (second frequency pass band) of the second BPF 17 in association with the channel. FIG. 9 is a diagram explaining the frequency pass band stored in a memory 19. In FIG. 9, the first frequency pass band and the second frequency pass band are stored for each of the selected channel preliminarily set in the control portion 20. Here, the first frequency pass band is a value that the first adjustment portion 21 applies to the first BPF 11 by using the process explained in the first embodiment or the second embodiment. The second frequency pass band is a value that the second adjustment portion 22 applies to the second BPF 17 by using the process explained in the first embodiment or the second embodiment. The memory 19 can be any device as long as it is a volatile memory capable of rewriting data. For example, a PROM and a flash memory can be used.

The setting portion 23 applies the first frequency pass band stored in the memory 19 to the first variable BPF 11 and applies the second frequency pass band stored in the memory 19 to the second variable BPF 17 each time when the channel is selected.

In other words, in the third embodiment, the adjustment of the first frequency pass band and the second frequency pass band is not performed each time when the channel is selected. The adjustment is performed only when it is required. Since the process of the adjustment is not performed each time when the channel is selected, a load of the control portion 20 can be reduced.

As explained above, the memory 19, which corresponds to the storage portion, stores the first frequency adjusted by the first adjustment portion 21 and the second frequency adjusted by the second adjustment portion 22. Then, each time when the channel is selected, the first frequency stored in the memory 19 (storage portion) is applied to the first band-pass filter 11 and the second frequency stored in the memory 19 (storage portion) is applied to the second band-pass filter 17. The process of applying the center frequency is performed by the setting portion 23 of the control portion 20.

In addition, the stored center frequency can be normally used and an optimal center frequency can be searched in a predetermined timing, e.g., after a predetermined period has passed. This can prevent an influence caused by change due to passage of time.

4. Fourth Embodiment

The receiver 100 can include a plurality of tuning circuits. Each of the tuning circuits can have the function of improving quality shown in the first embodiment and the second embodiment.

Figure 10:
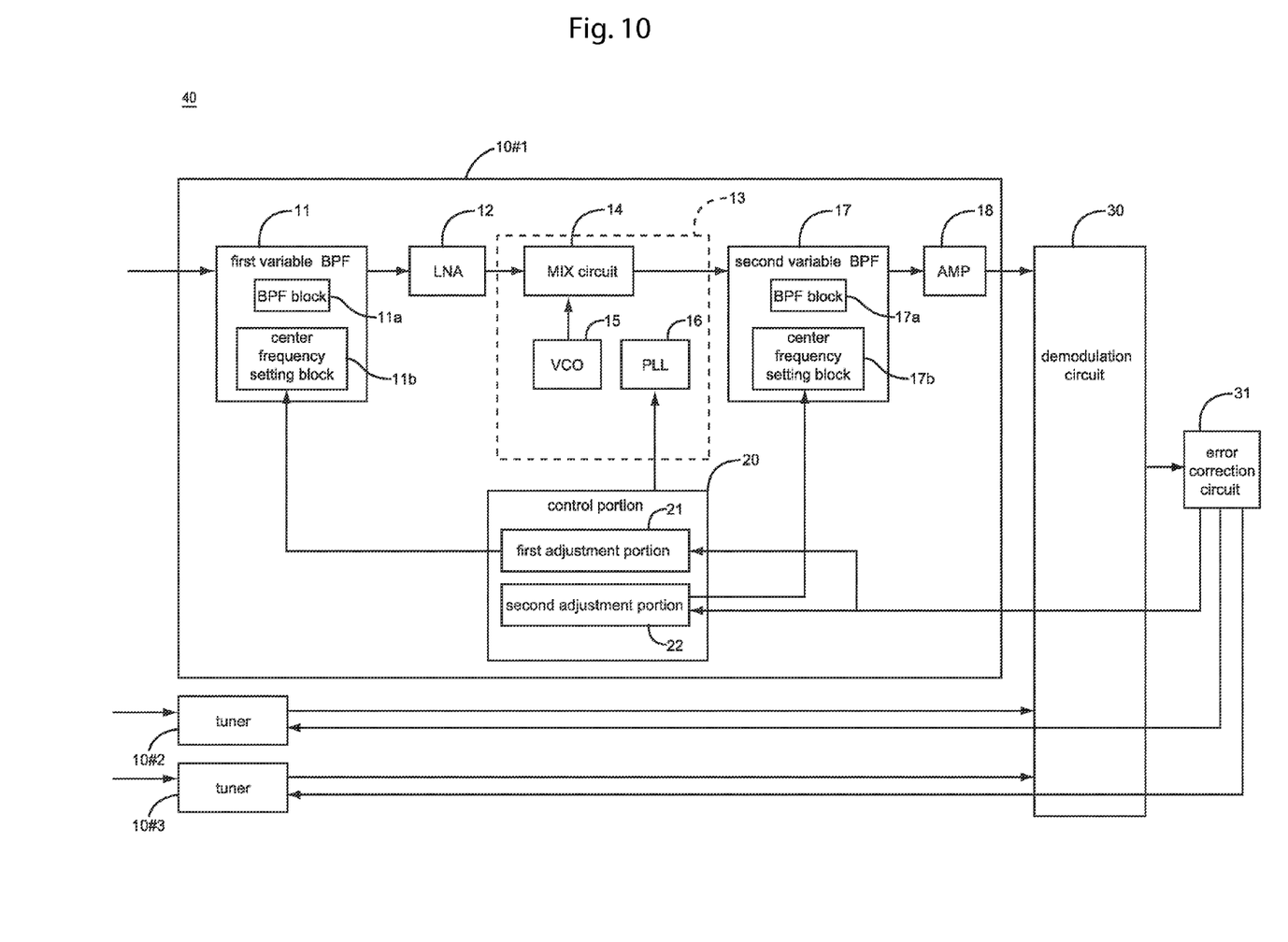
FIG. 10 is a diagram showing a part of a receiver 100 of the fourth embodiment.

FIG. 10 is a diagram showing a part of the receiver 100 of the fourth embodiment. In FIG. 10, three tuners 10#1 to 10#3 are provided. Each of the tuners 10#1 to 10#3 is connected to the demodulation circuit 30. The tuners 10#1 to 10#3 can extract the IF signal corresponding to the selected channel from the RF signal received from the antenna 200. Same as the first embodiment, the tuners 10#1 to 10#3 include the first variable BPF, the mixing circuit, the second variable BPF, the AMP and the control portion. The demodulation circuit 30 is connected to the error correction circuit 31. The error correction circuit 31 is connected to the control portion 20. The error correction circuit 31 outputs the C/N ratio and the BER value of the IF signal to the control portion 20. In FIG. 10, the demodulation circuit 30 is commonly used for the tuners 10#1 to 10#3. However, the demodulation circuit 30 can be separately provided each for the tuners 10#1 to 10#3. From the above, in the fourth embodiment, the receiver 100 includes a plurality of tuning circuits 40.

As explained above, in the fourth embodiment, when the receiver 100 includes a plurality of tuning circuits, the quality of the output signal can be improved for each of the selected channel. In other words, the receiver 100 includes at least two tuning circuits.

5. Other Embodiments

The recording device used in the explanation is merely an example of the receiver. The receiver can be any devises as long as it has a tuning function. For example, a set-top box, a television receiver and a personal computer can be used as the receiver.

The tuner 10 can have a band-pass filter for acquiring the frequency band of UHF 470 to 578 MHz, which is the frequency band in which digital television broadcast is broadcasted, before the first variable BPF.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

What is claimed is:

1. A tuning circuit that outputs an output signal corresponding to a selected channel from a broadcast signal, comprising:
    a first band-pass filter that passes a first predetermined frequency band corresponding to the selected channel in the broadcast signal;
    a mixing circuit that generates a mixed signal by mixing a signal having a frequency band corresponding to the selected channel with the broadcast signal passed through the first band-pass filter;
    a second band-pass filter that passes a second predetermined frequency band in the mixed signal, and
    a circuit that is connected to an output side of the second band-pass filter and generates the output signal, and
    at least one of a first adjustment portion that specifies the first frequency of the first band-pass filter and a second adjustment portion that specifies the second frequency of the second band-pass filter, wherein
    the first adjustment portion and the second adjustment portion change the first frequency and the second frequency to make an evaluation value of the output signal output from the circuit become a predetermined value, further wherein
    the first adjustment portion acquires the evaluation value each time when the first frequency is changed, and if the evaluation value is improved, the first adjustment portion applies the changed first frequency to the first band-pass filter, and
    the second adjustment portion acquires the evaluation value each time when the second frequency is changed, and if the evaluation value is improved, the second adjustment portion applies the changed second frequency to the second band-pass filter.

2. The tuning circuit according to claim 1, wherein the evaluation value includes at least one of a carrier/noise ratio and a bit error rate.

3. The tuning circuit according to claim 1, wherein the evaluation value used in the first adjustment portion is different from the evaluation value used in the second adjustment portion.

4. The tuning circuit according to claim 2, wherein the first adjustment portion uses the carrier/noise ratio as the evaluation value and, the second adjustment portion uses the bit error rate as the evaluation value.

5. The tuning circuit according to claim 1, wherein the first adjustment portion acquires a plurality of evaluation values by changing the first frequency, and
    when one of the acquired plurality of evaluation values exceeds the predetermined value, the first adjustment portion applies the first frequency corresponding to the one of the acquired plurality of evaluation values to the first band-pass filter.

6. The tuning circuit according to claim 1, wherein the first adjustment portion changes the first frequency and acquires a plurality of evaluation values for each of the changed first frequency,
    the first adjustment portion modifies each of the evaluation values based on the acquired plurality of evaluation values,
    the first adjustment portion selects the first frequency based on the modified evaluation values, and
    the first adjustment portion applies the selected first frequency to the first band-pass filter.

7. The tuning circuit according to claim 1, wherein the second adjustment portion acquires a plurality of evaluation values by changing the second frequency, and
    when one of the acquired plurality of evaluation values exceeds the predetermined value, the second adjustment portion applies the second frequency corresponding to the one of the acquired plurality of evaluation value to the second band-pass filter.

8. The tuning circuit according to claim 1, wherein the second adjustment portion changes the second frequency and acquires a plurality of evaluation values for each of the changed second frequency,
    the second adjustment portion modifies each of the evaluation values based on the acquired plurality of evaluation values,
    the second adjustment portion selects the second frequency based on the modified evaluation values, and
    the second adjustment portion applies the selected second frequency to the second band-pass filter.

9. The tuning circuit according to claim 1, wherein the first adjustment portion and the second adjustment portion adjust the first frequency and the second frequency when the channel is selected.

10. The tuning circuit according to claim 1, further comprising:
    a storage portion that stores the first frequency adjusted by the first adjustment portion and the second frequency adjusted by the second adjustment portion; and a setting portion that applies the first frequency stored in the storage portion to the first band-pass filter each time when the channel is selected and applies the second frequency stored in the storage portion to the second band-pass filter each time when the channel is selected.

11. The tuning circuit according to claim 10, wherein
the first adjustment portion and the second adjustment portion adjust the first frequency and the second frequency in a predetermined timing, and
the storage portion stores the adjusted first frequency and second frequency.

12. A receiver including the tuning circuit according to claim 1.

13. The receiver according to claim 12, further comprising:
a display portion that displays the evaluation values acquired after the first frequency and the second frequency are adjusted.

14. The receiver according to claim 12, wherein
the receiver includes two or more tuning circuits.

* * * * *